(No Model.)
J. H. CAMPBELL.
METHOD OF UTILIZING AQUA AMMONIA AS A MOTIVE POWER IN ENGINES.
No. 399,132. Patented Mar. 5, 1889.
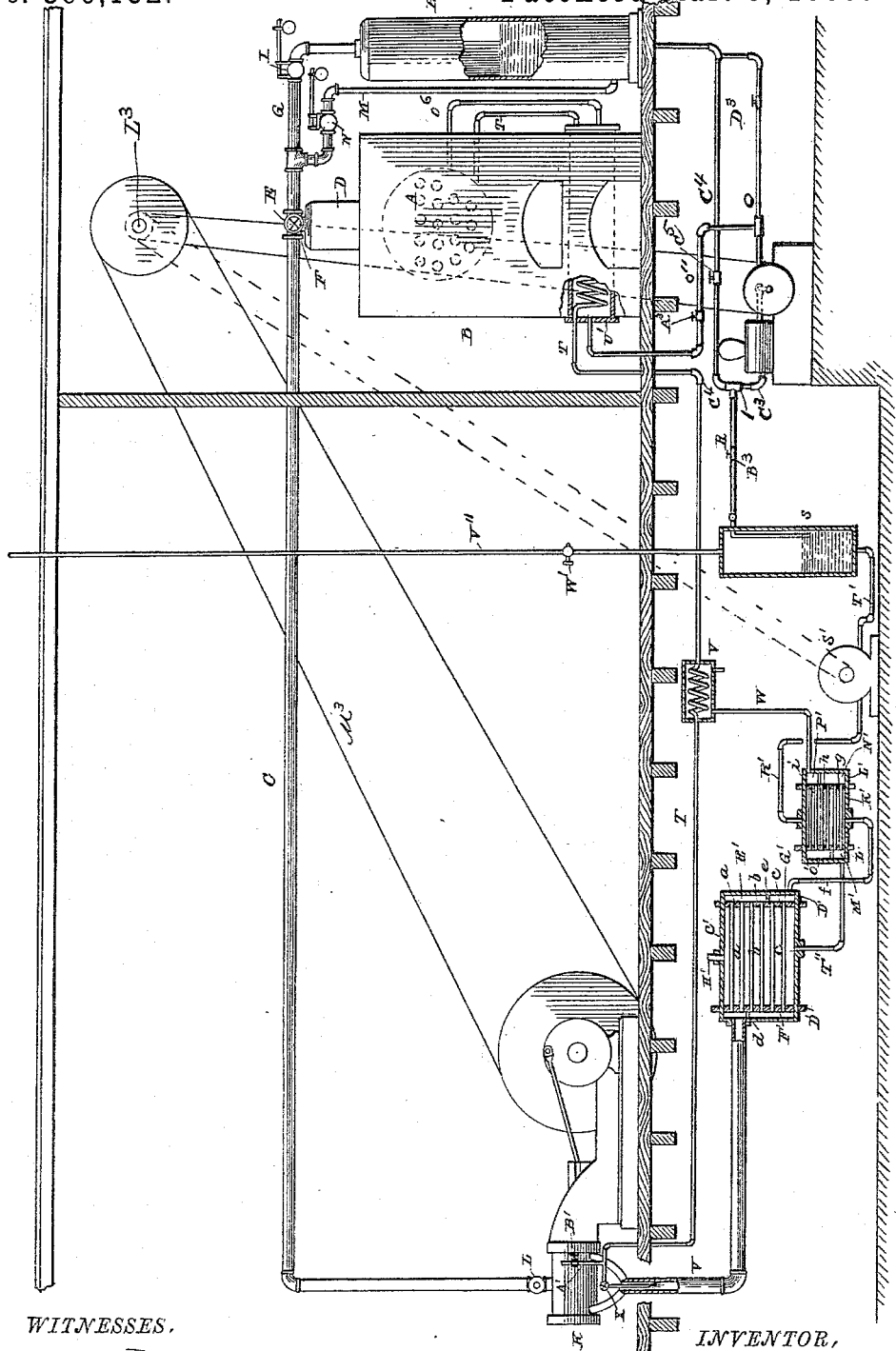
WITNESSES.
Edwin L. Yewell,
S. S. Sinebaugh
INVENTOR,
Jos. H. Campbell
By
S. W. Sinebaugh
Attorney.

UNITED STATES PATENT OFFICE.

JOSEPH H. CAMPBELL, OF NEW YORK, N. Y.

METHOD OF UTILIZING AQUA-AMMONIA AS A MOTIVE POWER IN ENGINES.

SPECIFICATION forming part of Letters Patent No. 399,132, dated March 5, 1889.

Application filed August 6, 1887. Renewed July 24, 1888. Serial No. 280,918. (No model.)

*To all whom it may concern:*

Be it known that I, JOSEPH H. CAMPBELL, a citizen of the United States, residing at New York, in the county of New York, State of New York, have invented certain new and useful Improvements in the Method of Utilizing Aqua-Ammonia as a Motive Power in Engines, of which the following is a specification, reference being had therein to the accompanying drawings.

My invention relates to improvements in the method of and apparatus for utilizing aqua-ammonia as a motive power in engines, and more particularly to that class of engines embraced in my United States patents, Nos. 337,371, 337,372, 337,373, and 337,374, of March 9, 1886, and No. 346,425 of July 27, 1886.

The object of my present invention is to fully saturate the weak solution used for spraying with the exhaust-vapor from the cylinder of the engine by subjecting such solution, together with the excess or unabsorbed vapor, to progressive and continuous steps of absorption—that is, the liquid used as spray is heated and cooled alternately many times after it is brought in contact with the exhaust-vapor from the cylinder before it arrives at the well, whereby the cylinder is relieved from back-pressure caused by the accumulation of the vapor.

My invention, therefore, consists in the method of subjecting the vapors or gases to progressive and continuous steps or stages of absorption, which consists in bringing the exhaust-vapor from the cylinder and the weak solution in contact with each other in the exhaust-pipe before they reach the absorber, then in carrying off the heat of absorption, so that the solution will be fully charged and practically cold when it reaches the well.

My invention consists, further, in causing the spray of cooled weak solution to come in contact with the exhaust-vapor from the cylinder and to be carried away to the absorbers and well with considerable velocity, whereby the force of adhesion is utilized to remove the exhaust-vapor from the cylinder and prevent an accumulation of the same in the pipes leading from the cylinder.

My invention consists, further, in passing the exhaust-vapor and cooled weak solution through a horizontal absorber—that is, an absorber having horizontal tubes—so constructed that the liquid will by gravity flow through and out of the absorber, thus preventing an accumulation of the liquid solution in the absorber, which would obstruct the free passage of the solution through it, in order that the heat generated by absorption may be readily carried away by the cooling agent.

My invention consists, further, in the method of indicating low water in the boiler, which consists in placing the spray-pipe at the low-water line in the boiler, whereby, when the water or solution reaches that point, the vapor instead of the solution will pass through the spray-pipe and produce a back-pressure on the cylinder, thus checking the engine.

My invention consists, further, in the method of drawing off any vapor or gas in excess of full saturation by the aid of a pump, thereby increasing the vacuum on the piston to assist the engine and increasing the pressure in the well to aid absorption.

My invention consists, further, in removing any air which may have been drawn into the cylinder and from thence passed over into the well by means of a pipe, which is inserted in the top covering of the well and projecting to the external air, said pipe being provided with a suitable valve for opening and closing said pipe.

My invention consists, further, in lubricating the cylinder and the valves of the steam-chest by injecting by boiler-pressure a spray of the solution into the cylinder prior to admitting the working-vapor.

Other novel and important features of my invention will be fully described hereinafter, and pointed out in the claims.

In the drawing I have shown in a longitudinal vertical view, partly in section, the devices which I now have in practical operation.

A indicates the boiler, which may be of any suitable or desirable construction, but by preference a horizontal tubular boiler, said boiler being mounted in any suitable manner in the bed of masonry, B, and provided with a furnace and ash-pit of the usual and well-known construction.

C is a pipe, one end of which communicates with the steam-dome D of the boiler by means of the T joint or coupling E, the said joint being provided with a two-way cock or valve, F, for a purpose which will more fully appear. The other end of the pipe C is connected to the steam-chest of the cylinder K, and is provided with a suitable throttle-valve, L.

G is a pipe, one end of which is joined to the T joint or coupling, while the other end communicates with the top of the dynamical reservoir H, and is provided with an automatic valve, I, by which an excess of pressure in either the boiler or the dynamical reservoir can be regulated.

M is a pipe, one end of which is secured to and connects with the pipe G, while the other end of said pipe communicates with the bottom of the dynamical reservoir. The pipe M is also provided with a safety-valve, N, which opens when there is an excess of pressure in both the boiler and upper portion of the dynamical reservoir, so that the vapor will be transferred to the solution contained in the dynamical reservoir. The strength of the solution in the dynamical reservoir may also be regulated by means of the pipe M and valve N.

O is a supply-pipe, one end of which communicates with the boiler, while the other end communicates with the pump P.

R is a pipe leading from the pump to the well S, and through which the solution is drawn from the well by the pump and forced through the pipe O into the boiler.

T is a spray-pipe leading from the boiler to the exhaust-pipe V of the cylinder. The pipe T enters the boiler at or below the low-water level, so that there is a constant flow of the solution under boiler-pressure from the boiler toward the cylinder and exhaust-pipe V. The pipe T also acts as a safety appliance to the boiler in the following manner: When the solution in the boiler comes below the mouth of the pipe T, the vapor, instead of the solution, will rush through said pipe and be mingled with the exhaust-vapor from the cylinder. The excess of vapor at this point causes a back-pressure on the piston of the cylinder, which checks or stops the engine. The pipe T is coiled in a cooling-chamber, V′, in order to reduce the temperature of the solution passing therethrough and bring it to the proper temperature to more readily absorb the exhaust-vapor from the engine, said cooling-chamber V′ being supplied with water through the pipe W. The end of the pipe T which enters the exhaust-pipe V is made contracted or nozzle-shaped, so that the liquid or solution from the boiler will be sprayed when brought into contact with the exhaust-vapor, thus increasing its absorptive capacity. The pipe T is provided with a valve or cock, X, by means of which the amount of solution admitted to the exhaust-pipe can be regulated.

A′ is a branch pipe provided with a valve or cock, B′, leading from the spray-pipe T to the interior of the cylinder, and through which a spray of the weak solution is forced by boiler-pressure into the cylinder prior to turning on the vapor, which lubricates the cylinder and valves of the steam-chest.

C′ is a horizontal tubular absorber, termed the "primary absorber" to distinguish it from another absorber, which is employed in the subsequent stages of absorption. The absorber C′ is provided with a series of horizontal tubes, $a$, $b$, and $c$, and with double heads D′. The spaces between the double heads are divided by means of the partitions $d$ and $e$, so as to form chambers E′, F′, and G′. The chambers E′ and F′ are connected by the tubes $b$, and the chambers F′ and G′ by the tubes $c$.

H′ is a cold-water pipe leading into the top of the primary absorber C′ from any suitable source of supply, and T″ is an exit-pipe which connects the bottom of the primary absorber with the secondary absorber K′.

The cold water admitted to the primary absorber passes down around the tubes $a$, $b$, and $c$ and cools the same, which reduces the temperature of the solution passing through said pipes to the proper temperature for absorbing the vapor. The exhaust-vapor from the cylinder and the spray of cooled weak solution passing through the pipe T from the boiler are brought together in the pipe V and pass through the pipes or tubes $a$ in the upper portion of the primary absorber C′ and into the chamber E′, when it drops down to the bottom of said chamber to the pipe $b$ and absorbs the vapor which has accumulated in the chamber. By this act of absorption the solution is raised to a temperature so high by the heat of absorption that it will absorb no more vapor. It is now returned through the cooling-tubes $b$, where its temperature is reduced and its capacity for absorption restored, to the chamber F′, where it again falls through the vapor confined in this chamber and absorbs it. The heat of absorption again raises the temperature of the solution; but in passing through the tube $c$ it is again cooled and falls through the vapor in the chamber G′, where, absorbing an additional amount of vapor, it is further saturated and passes to the secondary absorber K′ and enters the same at the bottom thereof through the pipe $f$. By placing the absorber C′ in a horizontal instead of a vertical position and providing the same with vertical chambers and horizontal tubes and partitions, the liquid contents of the absorber are rapidly removed by gravity, leaving the tubes and cooling-surfaces exposed to contact with the exhaust-vapor as it passes successively from one chamber to another; and, furthermore, any accumulation of the exhaust-vapor at the entrance or top of the absorber is prevented.

The secondary absorber K′ is of the same construction as that of the primary absorber C′, having double heads L′, tubes $g$, $h$, and $i$, and chambers M′, N′, O′, and P′; but instead of passing the solution through the tubes it is passed around them, and the cold water for cooling purposes is passed first through the tubes $g$ into the chamber N' and then through the tubes $h$ into the chamber O', and through the tubes $i$ to the chamber P', from whence it finds its way to the cooling-chamber V' through the pipe W. The solution, after having absorbed a sufficient amount of the vapor to produce a partial vacuum in the cylinder, by passing down through the primary absorber C' and up through the secondary absorber K', finds its way to the well S through the pipes R' and T'. On account of the velocity with which the solution is forced forward by the exhaust from the cylinder of the engine, the force of the spray, and the vacuum created by the absorption of the vapor and the action of the pump, a large portion of the vapor adheres to the solution in excess of saturation at the temperature of the solution. This excess of vapor is released as soon as the solution comes to a state of rest. To avoid back-pressure on the piston, which would result from the vapor being released, and which has been carried along by adhesion, the solution is caused to enter at the bottom or lower part of the secondary absorber K' and to overflow from the top. As a consequence, this secondary absorber is at all times full of the solution, which is maintained at a lower temperature, so that any vapor released from the incoming solution is dissolved in this secondary absorber.

S' is a pump of any suitable kind, but preferably of the rotary type, located between the secondary absorber K' and the well S, (or may be located between the two absorbers,) and communicates with the same by means of the pipes R' and T'. The office or function of this pump is to increase the vacuum in the cylinder and produce a pressure in the well or in the secondary absorber, thus assisting the engine and aiding absorption.

R is a pipe leading from near the center of the well S to the pump P, and by which the solution is drawn from the well and forced into the chamber U' through the pipes O and O'', where the solution is partially heated before it reaches the boiler through the pipe $O^6$. The pipe R, leading from the well to the pump P, may extend down into the well about one-half of the way, as shown, and the well is permitted to remain partially filled with the solution, in order that the gases or vapor carried along by adhesion may be dissolved in this solution; and, furthermore, by having the well only partially filled with the solution a space is left in the upper portion of the well for the reception of any air which may have been drawn into the cylinder.

In order to transfer the solution from the well to the boiler or dynamical reservoir, or from the boiler to the dynamical reservoir, or from the dynamical reservoir to the boiler, or to the well, I employ the following devices:

The pipe R is provided with a cock, $B^3$, and is connected at its front end to a union-joint, to which the pipes $C^3$ and $C^4$ are connected. The pipe $C^3$ leads to and communicates with the pump P, while the pipe $C^4$ communicates with the lower portion of the dynamical reservoir, and is provided with a cock, $C^5$. The pipe O is provided with a cock, $D^3$, and is connected at one end to the pump P, while the other end is connected to and communicates with the pipe $C^4$ leading to the dynamical reservoir.

O'' is a pipe connecting the pipe O with the chamber U', and is provided with a cock, $A^3$.

In operating the devices just described to transfer the solution from one vessel to the other I proceed as follows: In pumping the solution from the well to the boiler the cocks $A^3$ and $B^3$ are opened and the valves $C^5$ and $D^3$ closed. This allows the solution to pass from the well through the pipes R and $C^3$ to the pump, from whence it is forced through the pipes O and O'' to the heating-chamber U', and from thence to the boiler through the pipe $O^6$. To transfer the solution from the dynamical reservoir to the boiler, the cocks $A^3$ and $C^5$ are opened and the cocks $B^3$ and $D^3$ closed. This will allow the solution to pass from the dynamical reservoir to the pump, from whence it is forced through the pipes O and O'' to the boiler in the manner already stated. In order to pump from the well direct to the dynamical reservoir, the cocks $A^3$ and $C^5$ are closed and the cocks $B^3$ and $D^3$ opened. This will allow the solution to be drawn from the well to the pump through the pipes R and $C^3$, from whence it is forced through the pipe O to the dynamical reservoir H.

By the above-described arrangement of pipes and cocks and the proper manipulation of the same I am enabled to transfer the solution from the dynamical reservoir to the boiler, or from the boiler to the reservoir, or from the well to the boiler or dynamical reservoir, or vice versa, as occasion may require, to increase or decrease the pressure of the vapor in either vessel, and thus insure at all times the proper working of the engine.

In this connection I will state that the spray-pipe T, leading from the boiler to the exhaust-pipe V, is coiled in the chamber U', so that the hot solution passing through the coils in its passage from the boiler to the exhaust will surrender a portion of its heat to the solution in the chamber U' and heat the same prior to entering the boiler.

V'' is a pipe leading from the upper portion of the well to the external air, through which the accumulated air in the well is permitted to escape. This pipe V'' is provided with a valve, W', which may be automatic in its action, so that when the pressure of air in the well becomes too great the valve will open and release the air and then close again when the minimum of pressure has been reached.

In operation, when the presence of air is suspected in the well and it is desired to remove the same, the operation is as follows:

The valve B³ in the pipe R is closed, which allows the solution to accumulate in the well, and as the well is being filled with the solution the air is forced out through the pipe V″. Then by opening the valve or cock B³ the solution in the well will be again reduced to its proper height in the well. The pumps P and S′ are driven by suitable belts from the shaft L³, said shaft being driven by a belt, M³, from the fly-wheel of the engine, as is clearly shown.

Having thus described my invention, what I claim, and desire to secure by Letters Patent, is—

1. The method herein described of absorbing vapor of ammonia, which consists in bringing said vapor in contact with cooled liquid from the boiler and then subjecting such solution and the unabsorbed vapor to successive simultaneous coolings and absorptions, alternating with the evolutions of heat produced by the successive absorptions, substantially as set forth.

2. The method herein described of absorbing vapor of ammonia, which consists in bringing said vapor in contact with a continuous stream of cooled liquid from the boiler, then subjecting such solution and the unabsorbed vapor to successive simultaneous coolings and absorptions, alternating with the evolutions of heat produced by the successive absorptions, and discharging the solution into a well below its liquid-line, substantially as set forth.

3. The method herein described of absorbing vapor of ammonia, which consists in passing such vapor with cooled liquid from the boiler into the upper end of a surface condenser or absorber provided with lateral tubes and vertical pockets, so as to drain the liquid contents from such surface condenser by gravity, substantially as set forth.

4. The method herein described of operating an aqua-ammonia engine, which consists in propelling the engine with vapor of ammonia, bringing the exhaust-vapor in contact with cooled liquid from the boiler, subjecting the solution and the unabsorbed vapor to successive simultaneous coolings and absorptions, alternating with the evolutions of heat produced by the successive absorptions, and returning the combined liquid and exhaust-vapor to the boiler, substantially as set forth.

5. The method herein described of operating an aqua-ammonia engine, which consists in propelling the engine with vapor of ammonia, bringing the exhaust-vapor in contact with a continuous stream of liquid from the boiler under boiler-pressure, subjecting the solution and the unabsorbed vapor to successive simultaneous coolings and absorptions, alternating with the evolutions of heat produced by the successive absorptions, and returning the combined exhaust-vapor and liquid to the boiler, substantially as set forth.

6. The method herein described of operating an aqua-ammonia engine, which consists in propelling the engine with vapor of ammonia, passing such vapor with cooled liquid from the boiler into the upper end of a surface condenser or absorber provided with lateral tubes and vertical pockets, so as to drain the liquid contents from such surface condenser by gravity into a suitable well, entering it below the liquid-line, and returning the contents of said well to the boiler, substantially as set forth.

7. In a vapor-engine, the method herein described of indicating a deficiency of liquid in the boiler, which consists in placing the spray-pipe at the low-water point and extending it into the exhaust-pipe of the cylinder, whereby when the solution in the boiler falls too low the vapor will rush over to the exhaust-pipe and cause a back-pressure on the piston to check the engine.

8. In ammonia-engines, the method herein described of drawing off from the cylinder the unabsorbed exhaust-vapor by producing a vacuum on the piston and creating a pressure in the well to aid absorption by means of a pump operating between the absorbers and well, as set forth.

9. The method herein described of purging the apparatus of air, which consists in carrying the air into a well, together with absorbing liquid and ammonia-vapor, absorbing the vapor under pressure produced by a pump, and forcing the air out of the well through an escape-pipe, substantially as set forth.

10. The method herein described of relieving the boiler of excessive pressure, which consists in discharging the excess of vapor into a reservoir containing absorbing-liquid below its liquid-line, said excessive pressure operating a safety-valve, substantially as set forth.

In testimony whereof I affix my signature in presence of two witnesses.

JOSEPH H. CAMPBELL.

Witnesses:
WM. S. BAINTON,
JAMES McLAIN.